(12) United States Patent
Machida et al.

(10) Patent No.: US 7,692,133 B2
(45) Date of Patent: Apr. 6, 2010

(54) PHOTOELECTRIC CONVERSION DEVICE INCLUDING A SWITCH BETWEEN REFERENCE VOLTAGE AND A SIGNAL PROCESSING CIRCUIT

(75) Inventors: Satoshi Machida, Chiba (JP); Masahiro Yokomichi, Chiba (JP); Daisuke Muraoka, Chiba (JP); Daisuke Okano, Chiba (JP); Mihoko Yamashita, Chiba (JP)

(73) Assignee: Seiko Instruments Inc. (JP)

( * ) Notice: Subject to any disclaimer, the term of this patent is extended or adjusted under 35 U.S.C. 154(b) by 194 days.

(21) Appl. No.: 12/072,943

(22) Filed: Feb. 28, 2008

(65) Prior Publication Data
US 2008/0236645 A1 Oct. 2, 2008

(30) Foreign Application Priority Data
Mar. 1, 2007 (JP) ............................. 2007-051809

(51) Int. Cl.
*H01J 40/14* (2006.01)

(52) U.S. Cl. ................................ 250/214 R; 250/208.1
(58) Field of Classification Search ............. 250/214 R, 250/208.1, 214.1; 348/294–311; 358/448; 257/290–292, 440–443, 231
See application file for complete search history.

(56) References Cited

U.S. PATENT DOCUMENTS 6,191,409 B1 * 2/2001 Muramatsu .............. 250/208.1

* cited by examiner

*Primary Examiner*—Que T Le
(74) *Attorney, Agent, or Firm*—Adams & Wilks

(57) ABSTRACT

Provided is a photoelectric conversion device for outputting an output voltage according to incident light, including photoelectric conversion unit for holding an optical charge generated by the incident light, a signal processing circuit impressed with a reference voltage for outputting the output voltage according to the incident light by applying a predetermined process to an output signal of the photoelectric conversion unit, and a switch provided between a terminal externally supplied with the reference voltage, and the signal processing circuit.

5 Claims, 4 Drawing Sheets

PHOTOELECTRIC CONVERSION DEVICE INCLUDING A SWITCH BETWEEN REFERENCE VOLTAGE AND A SIGNAL PROCESSING CIRCUIT

BACKGROUND OF THE INVENTION

1. Field of the Invention

The present invention relates to a photoelectric conversion device for outputting an output voltage according to an incident light.

2. Description of the Related Art

Presently, photoelectric conversion devices are used as image reading devices including facsimiles, image scanners, digital copying machines, and X-ray imaging devices. As the photoelectric conversion device, the contact image sensor (CIS), which is manufactured using single-crystal silicon chips, is widely known.

In other words, multiple photoelectric conversion devices are used as shown in FIG. 9. A photoelectric conversion device 41 includes a photoelectric conversion unit group 43 and a signal processing circuit 42. The photoelectric conversion unit group 43 includes multiple photoelectric conversion units (not shown) for each of pixels. The same reference voltage VREF is impressed on each of the photoelectric conversion devices 41 as shown in FIG. 10.

The photoelectric conversion unit outputs an output voltage VOUT according to a reset voltage Vreset used for resetting the photoelectric conversion unit and incident light to the signal processing circuit 42. The photoelectric conversion unit group 43 outputs the output voltages VOUT from the respective photoelectric conversion units in a time-series manner to the signal processing circuit 42. The signal processing circuit 42 outputs an output voltage VOUT2 according to the incident light by applying a predetermined process to the output voltage VOUT.

A description will now be given of operations of the photoelectric conversion unit group 43 and the signal processing circuit 42 in the conventional photoelectric conversion device 41. FIG. 11 shows a signal processing circuit of a conventional photoelectric conversion device.

When incident light enters photoelectric conversion means (not shown) mounted on the photoelectric conversion unit in the photoelectric conversion unit group 43, the photoelectric conversion means holds an optical charge. A reference signal upon a reset by the reset voltage, and an optical signal according to the quantity of the optical charge of the photoelectric conversion means are input to a sample-and-hold circuit 21 of the signal processing circuit 42. Multiple photoelectric conversion units are provided, and the reference signal and the optical signal output from the photoelectric conversion means of the respective photoelectric conversion units are input in a time-series manner into the sample-and-hold circuit 21. The sample-and-hold circuit 21, based on a signal φSH1, samples the reference signal input in a first half period, and holds the sampled reference signal in a last half period. In the last half period, a subtractor 24 obtains a difference between the sampled and held reference signal received via a buffer amplifier 22 and the optical signal received via a buffer amplifier 23 as described in JP 2005-012752 A (Patent Document 1).

However, according to the technology described in Patent Document 1, amplifiers on which the reference voltage VREF is impressed are not turned off completely, and currents thus always flow into a terminal on which the reference voltage VREF is impressed. As a result, when the reference voltage VREF is externally generated and supplied, the reference voltage VREF, which is externally generated, fluctuates according to the amount of the currents flowing into the terminal on which the reference voltage VREF is impressed. On this occasion, when the reference voltage VREF, which is externally generated, is impressed on the multiple photoelectric conversion devices 41, fluctuation of the reference voltage VREF in one photoelectric conversion device 41 causes the reference voltages VREF supplied for the other photoelectric conversion devices 41 to fluctuate, resulting in malfunction of the entire photoelectric conversion device 41. Therefore, there is required a solution to prevent the malfunction.

SUMMARY OF THE INVENTION

It is therefore an object of the present invention to provide a photoelectric conversion device which can stabilize a reference voltage which is externally supplied.

In order to solve the above-mentioned problem, the present invention provides a photoelectric conversion device for outputting an output voltage according to incident light, including: photoelectric conversion means for holding an optical charge generated by the incident light; a signal processing circuit impressed with a reference voltage for outputting the output voltage according to the incident light by applying a predetermined process to an output signal of the photoelectric conversion means; and a switch provided between a terminal externally supplied with the reference voltage, and the signal processing circuit.

Further, the present invention provides a photoelectric conversion device for outputting an output voltage according to incident light, including: photoelectric conversion means for holding an optical charge generated by the incident light; and a signal processing circuit constituted by an amplifier having a function for compulsorily turning off an output transistor impressed with a voltage according to a reference voltage, the signal processing circuit outputting the output voltage according to the incident light by applying a predetermined process to an output signal of the photoelectric conversion means.

According to the present invention, when the photoelectric conversion device is out of operation, the switch is controlled to be turned off, and a current path routing from a terminal, on which the reference voltage is impressed, to the ground via the switch is shut off. As a result, when the photoelectric conversion device is out of operation, the current does not flow into the terminal, on which the reference voltage is impressed, and the reference voltage externally generated thus becomes less fluctuating, resulting in a stable reference voltage.

Further, according to the present invention, when the photoelectric conversion device is out of operation, an output transistor is controlled to be turned off, and a current path routing from a terminal, on which the reference voltage is impressed, to the ground via the output transistor is shut off. As a result, when the photoelectric conversion device is out of operation, the current does not flow into the terminal, on which the reference voltage is impressed, and the reference voltage externally generated thus becomes less fluctuating, resulting in a stable reference voltage.

Further, according to the present invention, when the photoelectric conversion device is out of operation, the switch is controlled to be turned off, and a current path routing from a power supply, on which the reference voltage is impressed, to the terminal, on which the reference voltage is impressed, via the switch is shut off. As a result, when the photoelectric conversion device is out of operation, the current does not flow out of the terminal, on which the reference voltage is

DESCRIPTION OF THE PREFERRED EMBODIMENTS

A description will now be given of embodiments of the present invention with reference to the drawings.

It should be noted that the photoelectric conversion device according to the present invention includes a photoelectric conversion unit group (not shown) and a signal processing circuit (not shown). The photoelectric conversion unit group includes multiple photoelectric conversion units (not shown) for each of pixels.

The photoelectric conversion unit outputs an output voltage according to a reset voltage used for resetting the photoelectric conversion unit and incident light to the signal processing circuit. The photoelectric conversion unit group outputs the output voltages from respective photoelectric conversion units in a time-series manner to the signal processing circuit. The signal processing circuit, by applying a predetermined process to the output voltages, outputs an output voltage according to the incident light.

First Embodiment

Figure 1:
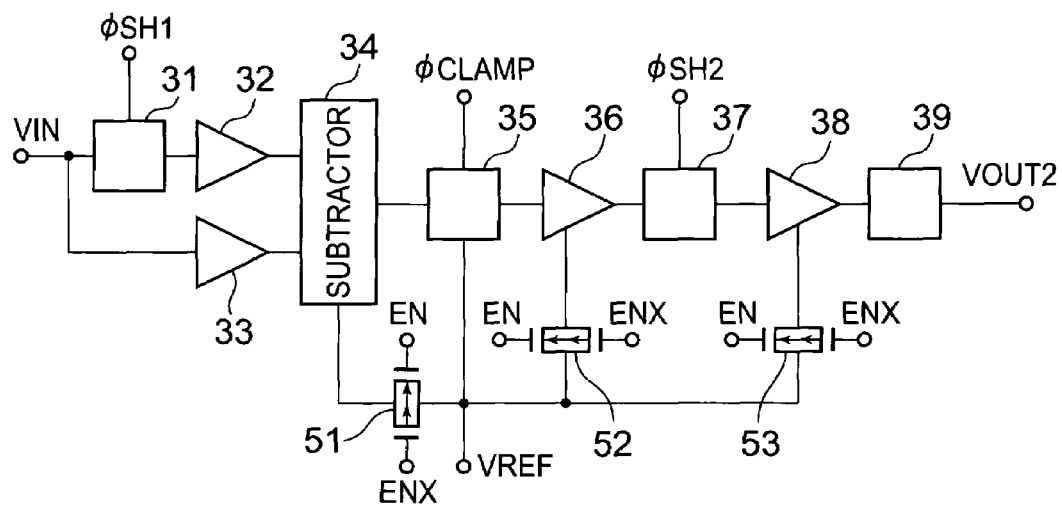
FIG. 1 shows a signal processing circuit of a photoelectric conversion device.

A description will now be given of a configuration of the signal processing circuit of the photoelectric conversion device. FIG. 1 shows the signal processing circuit of the photoelectric conversion device.

The signal processing circuit of the photoelectric conversion device includes a sample-and-hold circuit 31, buffer amplifiers 32 and 33, a subtractor 34, a clamp circuit 35, a non-inverting amplifier 36, a sample-and-hold circuit 37, a non-inverting amplifier 38, a transmission gate 39, and switches 51, 52, and 53.

A terminal on which an input voltage VIN (output voltage of the photoelectric conversion unit group) is impressed is connected to the sample-and-hold circuit 31 and the buffer amplifier 33. An output terminal of the sample-and-hold circuit 31 is connected to the buffer amplifier 32. Output terminals of the buffer amplifiers 32 and 33 are connected to the subtractor 34. An output terminal of the subtractor 34 is connected to the clamp circuit 35, and an output terminal of the clamp circuit 35 is connected to the non-inverting amplifier 36. An output terminal of the non-inverting amplifier 36 is connected to the sample-and-hold circuit 37, an output terminal of the sample-and-hold circuit 37 is connected to the non-inverting amplifier 38, and an output terminal of the non-inverting amplifier 38 is connected to the transmission gate 39. Moreover, a terminal, to which a reference voltage VREF is supplied from external of the photoelectric conversion device, is connected to the clamp circuit 35. This terminal is connected to the subtractor 34 via the switch 51, to the non-inverting amplifier 36 via the switch 52, and to the non-inverting amplifier 38 via the switch 53.

Figure 2:
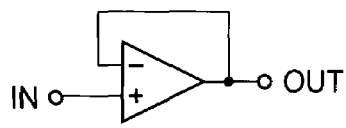
FIG. 2 is a circuit diagram showing a buffer amplifier.

A description will now be given of the buffer amplifiers 32 and 33. FIG. 2 is a circuit diagram showing the buffer amplifier.

The buffer amplifiers 32 and 33 perform the impedance conversion for an input voltage IN to output the voltage as an output voltage OUT.

Figure 3:
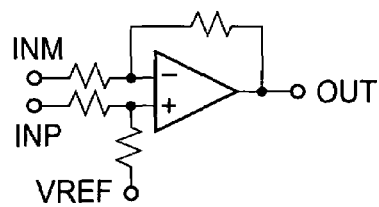
FIG. 3 is a circuit diagram showing a subtractor.

A description will now be given of the subtractor 34. FIG. 3 shows a circuit diagram showing the subtractor.

The subtractor 34 subtracts an input voltage INM from an input voltage INP, multiplies the voltage obtained by the subtraction by a gain defined by resistances of four resistors, and outputs an output voltage OUT obtained as a result of the multiplication with a reference voltage VREF as a reference.

Figure 4:
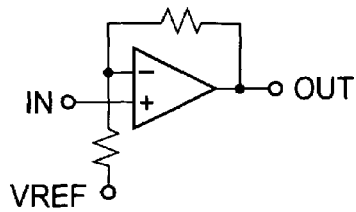
FIG. 4 is a circuit diagram showing a non-inverting amplifier.

A description will now be given of the non-inverting amplifiers 36 and 38. FIG. 4 is a circuit diagram showing the non-inverting amplifier.

The non-inverting amplifiers 36 and 38 multiply an input voltage IN by a gain defined by resistances of two resistors, and outputs an output voltage OUT obtained as a result of the multiplication with a reference voltage VREF as a reference.

Figure 5:
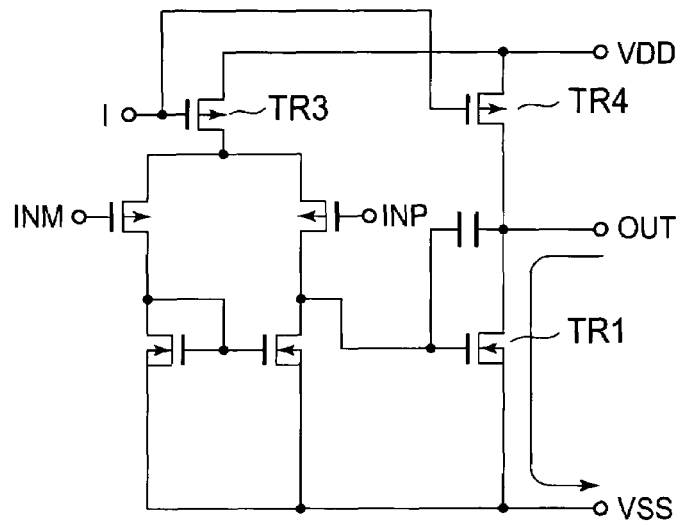
FIG. 5 is a circuit diagram showing an amplifier.

A description will now be given of amplifiers inside the buffer amplifiers 32 and 33, the subtractor 34, and the non-inverting amplifiers 36 and 38. FIG. 5 is a circuit diagram showing the amplifier.

When this amplifier is in operation, a voltage according to a difference in voltage between an input voltage INP and an input voltage INM is impressed on the gate of a transistor TR1, and the transistor TR1 then becomes in operation, and outputs an output voltage OUT. When the amplifier is out of operation, a signal I becomes high, and transistors TR3 and TR4 are turned off.

A description will now be given of operations of the photoelectric conversion unit group and the signal processing circuit when the photoelectric conversion device is in operation.

On this occasion, the signal I has reached a predetermined low level, and currents are flowing through the transistors TR3 and TR4.

When incident light enters photoelectric conversion means (not shown) such as a photodiode and a phototransistor mounted on the photoelectric conversion unit in the photoelectric conversion unit group, the photoelectric conversion means comes to hold an optical charge. A reference signal output upon a reset by the reset voltage, and an optical signal output according to the quantity of optical charge of the photoelectric conversion means are input to the sample-and-hold circuit 31 and the buffer amplifier 33 of the signal processing circuit respectively in a first half period and a last half period. Multiple photoelectric conversion units are provided, and the reference signal and the optical signal output from the photoelectric conversion means of the respective photoelectric conversion units are input in a time-series manner into the sample-and-hold circuit 31 and the buffer amplifier 33. The sample-and-hold circuit 31, based on a signal φSH1, samples the reference signal input in the first half period, and holds the sampled reference signal in the last half period.

In the last half period, the subtractor 34 obtains the difference between the sampled and held reference signal received via the buffer amplifier 32 and the optical signal received via the buffer amplifier 33. An output signal of the subtractor 34 in the last half period is a signal obtained by subtracting the reference signal from the optical signal, and multiplying the result of the subtraction by the gain, and adding the reference voltage VREF to the result of the multiplication. The subtractor 34 removes a noise component of the optical signal by subtracting the reference signal from the optical signal. Again, in the first half period, the same voltages are input to the subtractor 34 respectively via the buffer amplifiers 32 and 33.

On this occasion, in the first half period and the last half period, offsets of the buffer amplifiers 32 and 33 and the subtractor 34 are superimposed on the output signal of the subtractor 34. This output signal of the subtractor 34 is input to the clamp circuit 35.

In the first half period, based on a signal φCLAMP input to the clamp circuit 35, a terminal on which the reference voltage VREF is impressed is connected to the output terminal of the clamp circuit 35 via a switch, which is not shown. As a result, an output signal of the clamp circuit 35 in the first half period is clamped to the reference voltage VREF. On the other hand, in the last half period, based on the signal φCLAMP, the terminal on which the reference voltage VREF is impressed is not connected to the output terminal of the clamp circuit 35, which is not shown. There is provided a capacitance between the input terminal and the output terminal of the clamp circuit 35, and the output signal of the clamp circuit 35 in the last half period is a signal obtained by subtracting the output signal of the subtractor 34 in the first half period from the output signal of the subtractor 34 in the last half period, and adding the reference voltage VREF to a result of the subtraction. Therefore, the output signal of the clamp circuit 35 in the last half period is the signal obtained by subtracting the reference signal from the optical signal, and multiplying the result of the subtraction by the gain, and adding the reference voltage VREF to the result of the multiplication. It should be noted that the offsets of the buffer amplifiers 32 and 33, and the subtractor 34 are not superimposed on the output signal of the clamp circuit 35 in the last half period.

The output signal of the clamp circuit 35 is input to the non-inverting amplifier 36. An output signal of the non-inverting amplifier 36 is input to the sample-and-hold circuit 37.

In the last half period, based on a signal φSH2 input to the sample-and-hold circuit 37, the sample-and-hold circuit 37 samples the output signal of the non-inverting amplifier 36 according to the output signal of the clamp circuit 35 in the last half period. Moreover, in the first half period, based on the signal φSH2, the sample-and-hold circuit 37 holds the sampled signal, and an output signal of the sample-and-hold circuit 37 is maintained for a long period.

The output signal of the sample-and-hold circuit 37 is input to the non-inverting amplifier 38. An output signal of the non-inverting amplifier 38 is input to the transmission gate 39. The transmission gate 39 outputs an output voltage VOUT2 according to the optical charge according to the incident light.

A description will now be given of the operation of the signal processing circuit when the photoelectric conversion device is out of operation.

The signal I becomes high, and the transistors TR3 and TR4 in the amplifier in FIG. 5 are turned off. Moreover, a signal EN becomes low, and a signal ENX becomes high. Thus, the switches 51, 52, and 53 are turned off.

As a result, when the signal processing circuit of the photoelectric conversion device is out of operation, by controlling the switch 51 to be turned off, a current path from the terminal in the signal processing circuit in FIG. 1 to which the reference voltage VREF is supplied, through the switch 51 in the signal processing circuit in FIG. 1, through a terminal of the subtractor 34 in FIG. 3 on which the reference voltage VREF is impressed, through the two resistors of the subtractor 34 in FIG. 3, through a terminal of the subtractor 34 in FIG. 3 on which the input voltage INP is impressed, through the output terminal of the buffer amplifier 33 in FIG. 2 from which the output voltage OUT is output, through the transistor TR1 of the amplifier in FIG. 5, through the ground is shut off.

Moreover, when the signal processing circuit of the photoelectric conversion device is out of operation, by controlling the switch 52 to be turned off, a current path from the terminal in the signal processing circuit in FIG. 1 to which the reference voltage VREF is supplied, through the switch 52 in the signal processing circuit in FIG. 1, through a terminal of the non-inverting amplifier 36 in FIG. 4 on which the reference voltage VREF is impressed, through the two resistors of the non-inverting amplifier 36 in FIG. 4, through the output terminal of the non-inverting amplifier 36 in FIG. 4 from which the output voltage OUT is output, through the transistor TR1 of the amplifier in FIG. 5, through the ground is shut off.

Moreover, the same holds true for the switch 53.

As a result, when the signal processing circuit of the photoelectric conversion device is out of operation, the currents will not flow into the terminal to which the reference voltage VREF is supplied, and the power consumption of the photoelectric conversion device is thus reduced. Moreover, the reference voltage VREF, which is externally generated, becomes less fluctuating, and is thus stabilized. On this occasion, usually, multiple photoelectric conversion devices are used, and these photoelectric conversion devices become in operation in turn in a time-series manner. In other words, when one of the photoelectric conversion devices becomes in operation and outputs a signal, the other photoelectric conversion devices become out of operation and do not output a signal. In these photoelectric conversion devices which are out of operation, since the currents will not flow into the terminal to which the reference voltage VREF is supplied, the power consumption of the overall system is reduced. Moreover, the reference voltage VREF, which is externally generated, becomes less fluctuating, and is thus stabilized.

Figure 10:
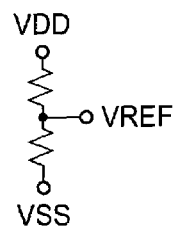
FIG. 10 shows a reference voltage.
Figure 11:
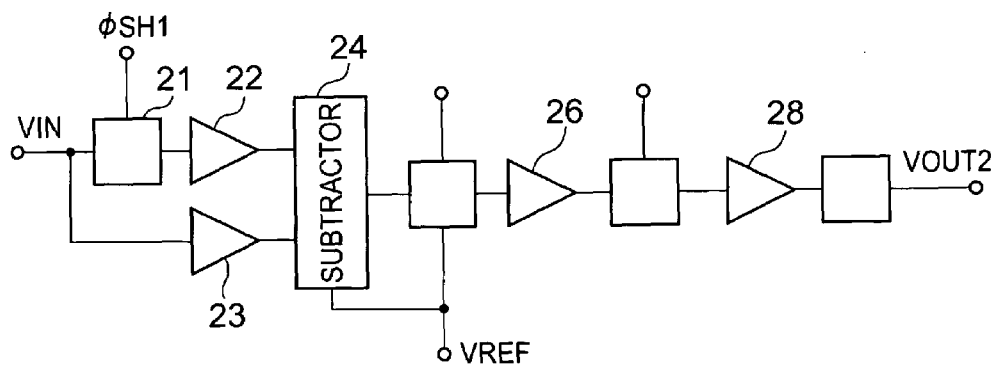
FIG. 11 shows a signal processing circuit of a conventional photoelectric conversion device.

When the reference voltage VREF tends to fluctuate, resistance values of the resistors in a circuit for generating the reference voltage VREF shown in FIG. 10 need to be low, and the power consumption thus increases in this circuit. However, by making the reference voltage VREF less fluctuating, these resistance values can be high, and thus the power consumption becomes low in this circuit.

Second Embodiment

Figure 6:
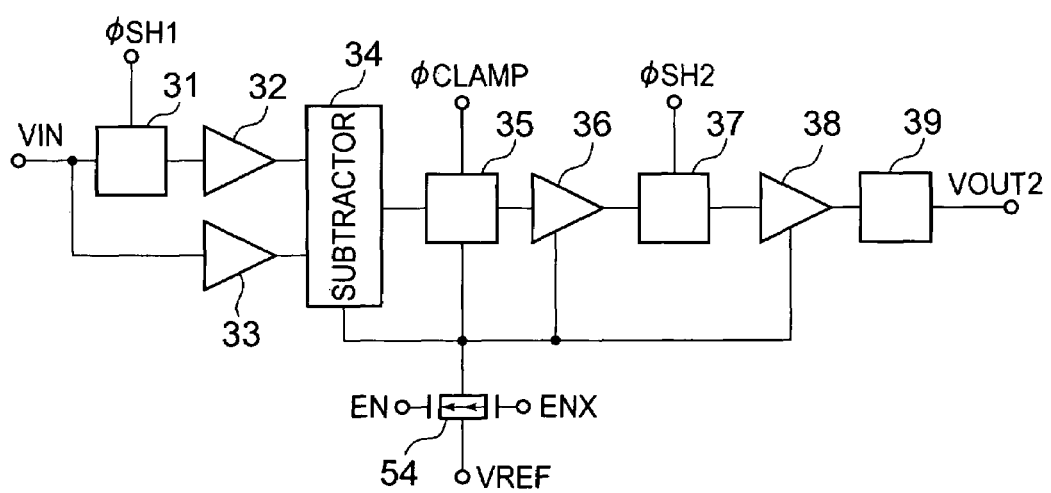
FIG. 6 shows a signal processing circuit of the photoelectric conversion device.

While the switches are provided respectively for the amplifiers in the first embodiment, one switch may be provided for these amplifiers. FIG. 6 shows a signal processing circuit of a photoelectric conversion device.

In the signal processing circuit of the photoelectric conversion device according to the second embodiment, compared with the first embodiment, the respective switches provided between branch points of the terminals on which the reference voltage VREF is impressed, which branches toward the respective amplifiers, and the respective amplifiers are removed, and a switch 54 is added between the terminal on which the reference voltage VREF is impressed and the branch point.

A description will now be given of an operation of the signal processing circuit when the photoelectric conversion device is in operation.

The operation of the second embodiment is similar to that of the first embodiment.

A description will now be given of an operation of the signal processing circuit when the photoelectric conversion device is out of operation.

The signal I becomes high, and the transistors TR3 and TR4 in the amplifier in FIG. 5 are turned off. Moreover, the signal EN becomes low, and the signal ENX becomes high. Thus, the switch 54 is turned off.

Third Embodiment

In the first embodiment, though the amplifier in FIG. 5 is used, an amplifier which has a function for compulsorily turning off the transistor TR1 may be used.

In a signal processing circuit of the photoelectric conversion device according to the third embodiment, compared with the first embodiment, the respective switches provided between the branch points branching from the terminals on which the reference voltage VREF is impressed toward the respective amplifiers and the respective amplifiers are removed, which is not shown.

Figure 7:
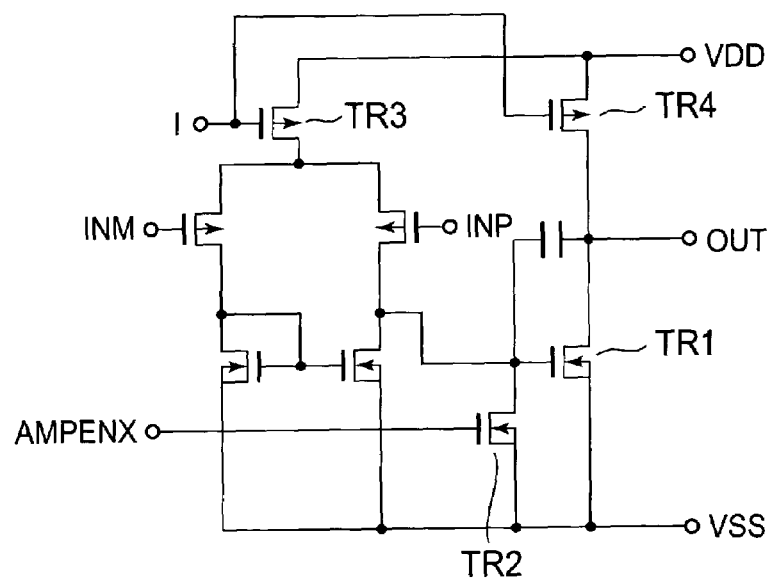
FIG. 7 is a circuit diagram showing an amplifier.

A description will now be given of the amplifiers inside the buffer amplifiers 32 and 33, the subtractor 34, and the non-inverting amplifiers 36 and 38. FIG. 7 is a circuit diagram showing the amplifier.

When this amplifier is in operation, a voltage according to a difference in voltage between an input voltage INP and an input voltage INM is impressed on a gate of a transistor TR1, and the transistor TR1 then operates, and outputs an output voltage OUT. When the amplifier is out of operation, the signal I becomes high, transistors TR3 and TR4 are turned off, a signal AMPENX becomes high, a transistor TR2 is turned on, the gate voltage of the transistor TR1 becomes low, and the transistor TR1 is turned off. As a result, a current will not flow between the output terminal which outputs the output voltage OUT, and the ground.

A description will now be given of an operation of the signal processing circuit when the photoelectric conversion device is in operation.

The operation of the third embodiment is similar to that of the first embodiment.

A description will now be given of an operation of the signal processing circuit when the photoelectric conversion device is out of operation.

The signal I becomes high, the transistors TR3 and TR4 in FIG. 7 are turned off, the signal AMPENX becomes high, the transistor TR2 is turned on, the gate voltage of the transistor TR1 becomes low, and the transistor TR1 is turned off.

As a result, when the signal processing circuit of the photoelectric conversion device is out of operation, by controlling the transistor TR1 to be turned off, a current path from the terminal in the signal processing circuit in FIG. 1 to which the reference voltage VREF is supplied, through the terminal of the subtractor 34 in FIG. 3 on which the reference voltage VREF is impressed, through the two resistors of the subtractor 34 in FIG. 3, through the terminal of the subtractor 34 in FIG. 3 on which the input voltage INP is impressed, through the output terminal of the buffer amplifier 33 in FIG. 2 from which the output voltage OUT is output, through the transistor TR1 of the amplifier in FIG. 7, through the ground is shut off.

Moreover, when the signal processing circuit of the photoelectric conversion device is out of operation, by controlling the transistor TR1 to be turned off, a current path from the terminal in the signal processing circuit in FIG. 1 to which the reference voltage VREF is supplied, through the terminal of the non-inverting amplifier 36 or 38 in FIG. 4 on which the reference voltage VREF is impressed, through the two resistors of the non-inverting amplifier 36 or 38 in FIG. 4, through the output terminal of the non-inverting amplifier 36 or 38 in FIG. 4 from which the output voltage OUT is output, through the transistor TR1 of the amplifier in FIG. 7, to the ground is shut off.

As a result, when the signal processing circuit of the photoelectric conversion device is out of operation, the currents will not flow into the terminal to which the reference voltage VREF is supplied, and the power consumption of the photoelectric conversion device is thus reduced. Moreover, the reference voltage VREF, which is externally generated, becomes less fluctuating, and is thus stabilized. On this occasion, usually, the multiple photoelectric conversion devices are used, and these photoelectric conversion devices become in operation in turn in a time-series manner. In other words, when one of the photoelectric conversion devices becomes in operation and outputs a signal, the other photoelectric conversion devices become out of operation and do not output a signal. In these photoelectric conversion devices which are out of operation, since the currents will not flow to the terminal to which the reference voltage VREF is supplied, the power consumption of the overall system is reduced. Moreover, the reference voltage VREF, which is externally generated, becomes less fluctuating, and is thus stabilized.

Fourth Embodiment

Figure 8:
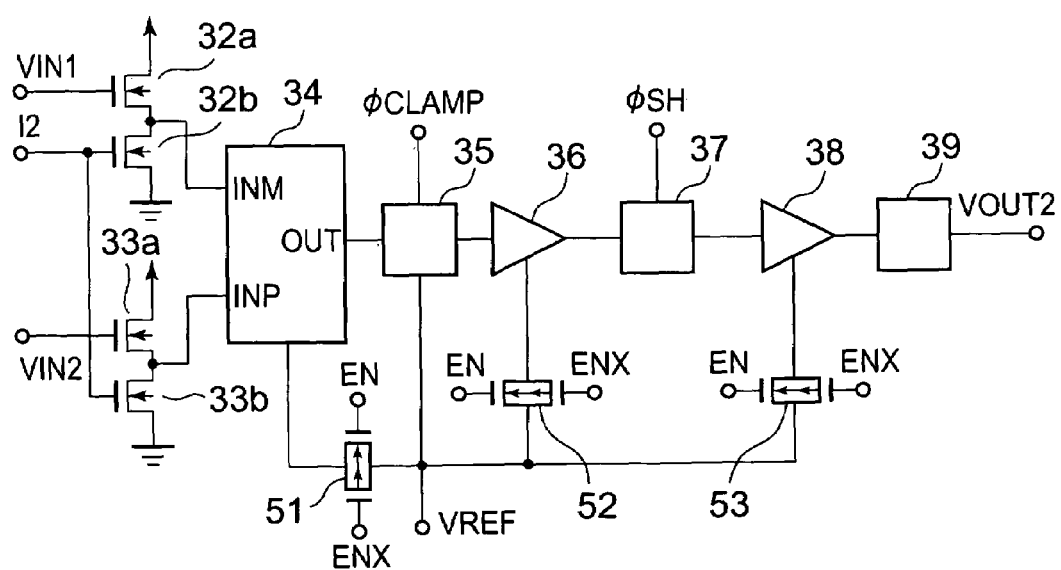
FIG. 8 shows a signal processing circuit of the photoelectric conversion device.
Figure 9:
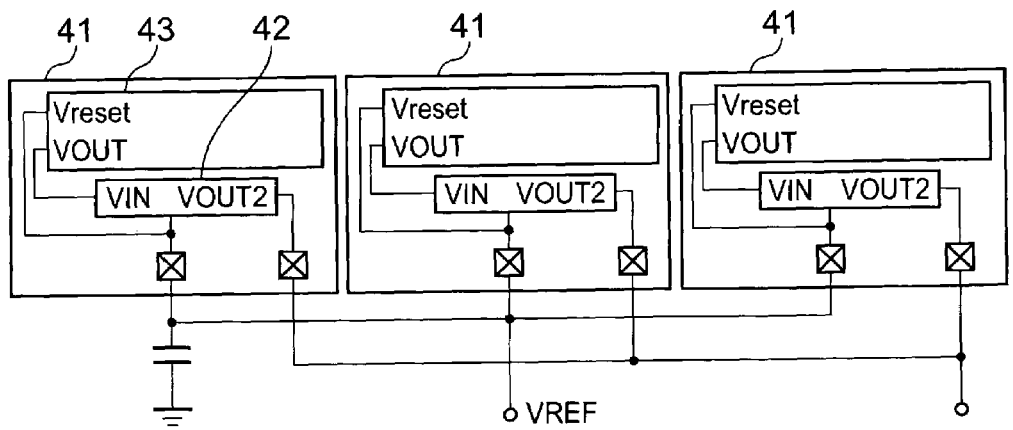
FIG. 9 shows multiple conventional photoelectric conversion devices.

Though the buffer amplifiers 32 and 33 are used in the first embodiment, source follower circuits may be used in place. FIG. 8 shows a signal processing circuit of the photoelectric conversion device.

The signal processing circuit of the photoelectric conversion device according to a fourth embodiment is changed from that of the first embodiment by removing the sample-and-hold circuit 31, changing the buffer amplifier 32 to a source follower circuit constituted by N-type transistors 32a and 32b, and changing the buffer amplifier 33 to a source follower circuit constituted by N-type transistors 33a and 33b.

In the source follower circuit constituted by the transistors 32a and 32b, a signal I2 is impressed on the gate of the transistor 32b to cause a current to flow through the transistor 32b, and the transistor 32b is thus considered as an on-state resistance. As a result, a source follower circuit is realized where the gate and the source of the transistor 32a are respectively input terminal and output terminal. The same holds true for the source follower circuit constituted by the transistors 33a and 33b. The transistors 32a and 33a have the same capability, and the transistors 32b and 33b have the same capability.

A description will now be given of an operation of the signal processing circuit when the photoelectric conversion device is in operation.

On this occasion, the signal I reaches a predetermined low level, and currents flow through the transistors TR3 and TR4. Moreover, the signal I2 reaches a predetermined high level, and currents flow through the transistors 32b and 33b.

When incident light enters the photoelectric conversion means (not shown) such as a photodiode and a phototransistor, mounted on the photoelectric conversion unit in the photoelectric conversion unit group, the photoelectric conversion means comes to hold an optical charge. The reference signal of the photoelectric conversion means upon reset by the reset voltage is input to the subtractor 34 of the signal processing circuit via the source follow circuit in the last half period. The optical signal of the photoelectric conversion means according to the quantity of the optical charge is input to the subtractor 34 of the signal processing circuit via the source follow circuit in the last half period. The multiple photoelectric conversion units are provided, and the reference signal and the optical signal output from the photoelectric conversion means of the respective photoelectric conversion units are input in a time-series manner into the subtractor 34.

In the last half period, the subtractor 34 obtains a difference between the reference signal and the optical signal. An output signal of the subtractor 34 in the last half period is a signal obtained by subtracting the reference signal from the optical signal, and multiplying the result of the subtraction by the gain, and adding the reference voltage VREF to the result of the multiplication. The subtractor 34 removes a noise component of the optical signal by subtracting the reference signal from the optical signal. Again, in the first half period, the same voltages are input to the subtractor 34 via the respective follower circuits.

Operations of the clamp circuit 35, the non-inverting amplifier 36, the sample-and-hold circuit 37, the non-inverting amplifier 38, and the transmission gate 39 are the same as those of the first embodiment.

A description will now be given of an operation of the signal processing circuit when the photoelectric conversion device is out of operation.

The signal I becomes high, and the transistors TR3 and TR4 in the amplifier in FIG. 5 are turned off. Moreover, the signal EN becomes low, and the signal ENX becomes high. Then, the switches 51, 52, and 53 are turned off. Moreover, the signal I2 becomes low, and the transistors 32b and 33b are thus turned off.

As a result, when the signal processing circuit of the photoelectric conversion device is out of operation, by controlling the switch 51 to be turned off, a current path from a power supply, through the transistor 33a, through the terminal of the subtractor 34 in FIG. 3 on which the input voltage INP is impressed, through the two resistors of the subtractor 34 in FIG. 3, through the terminal of the subtractor 34 in FIG. 3 on which the reference voltage VREF is impressed, to the terminal of the signal processing circuit in FIG. 8 on which the reference voltage VREF is impressed via the switch 51 of the signal processing circuit in FIG. 8 is shut off.

As a result, when the signal processing circuit of the photoelectric conversion device is out of operation, the current will not flow out from the terminal to which the reference voltage VREF is supplied, and the power consumption of the photoelectric conversion device is thus reduced. Moreover, the reference voltage VREF, which is externally generated, becomes less fluctuating, and is thus stabilized. On this occasion, usually, the multiple photoelectric conversion devices are used, and these photoelectric conversion devices become in operation in turn in a time-series manner. In other words, when one of the photoelectric conversion devices becomes in operation and outputs a signal, the other photoelectric conversion devices become out of operation and do not output a signal. In these photoelectric conversion devices which are out of operation, since the current will not flow out from the terminal to which the reference voltage VREF is supplied, the power consumption of the overall system is reduced. Moreover, the reference voltage VREF, which is externally generated, becomes less fluctuating, and is thus stabilized.

Further, the source follower circuits are used in place of the amplifiers on the preceding stage of the subtractor 34, noises due to thermal noises are reduced.

Fifth Embodiment

While the switches are provided respectively for the amplifiers in the fourth embodiment, one switch may be provided for these amplifiers.

In the signal processing circuit of the photoelectric conversion device according to a fifth embodiment, which is not shown, compared with the fourth embodiment, the respective switches provided between a branch point of the terminal with respect to the respective amplifiers on which the reference voltage VREF is impressed and the respective amplifiers are removed, and a switch is added between the terminal on which the reference voltage VREF is impressed and the respective branch points.

A description will now be given of an operation of the signal processing circuit when the photoelectric conversion device is in operation.

The operation of the fifth embodiment is similar to that of the fourth embodiment.

A description will now be given of an operation of the signal processing circuit when the photoelectric conversion device is out of operation.

The signal I becomes high, and the transistors TR3 and TR4 in the amplifier in FIG. 6 are turned off. Moreover, the signal EN becomes low, and the signal ENX becomes high. Then, the added switch is turned off. Moreover, the signal I2 becomes low, and the transistors 32b and 33b are thus turned off.

What is claimed is:

1. A photoelectric conversion device for outputting an output voltage according to incident light, comprising:
    photoelectric conversion means for holding an optical charge generated by the incident light;
    a signal processing circuit impressed with a reference voltage for outputting the output voltage according to the incident light by applying a predetermined process to an output signal of the photoelectric conversion means; and
    a switch provided between a terminal externally supplied with the reference voltage, and the signal processing circuit.

2. A photoelectric conversion device according to claim 1, wherein the signal processing circuit comprises:
    a sample-and-hold circuit for receiving a reference signal of the photoelectric conversion means when the photoelectric conversion means is reset by a reset voltage, and an optical signal of the photoelectric conversion means according to the quantity of the optical charge in a first period and a second period, respectively, sampling the reference signal input in the first period, and holding the sampled reference signal in the second period;
    a first buffer amplifier for receiving an output signal of the sample-and-hold circuit;
    a second buffer amplifier for receiving the reference signal and the optical signal; and
    a subtractor impressed with the reference voltage for removing a noise component of the optical signal by subtracting the sampled and held reference signal received via the first buffer amplifier from the optical signal received via the second buffer amplifier in the second period.

3. A photoelectric conversion device according to claim 1, wherein the signal processing circuit comprises:
- a first source follower circuit for receiving a reference signal of the photoelectric conversion means when the photoelectric conversion means is reset by a reset voltage;
- a second source follower circuit for receiving an optical signal of the photoelectric conversion means according to a quantity of the optical charge; and
- a subtractor impressed with the reference voltage for removing a noise component of the optical signal by subtracting the reference signal received via the first source follower circuit from the optical signal received via the second source follower circuit.

4. A photoelectric conversion device for outputting an output voltage according to incident light, comprising:
- photoelectric conversion means for holding an optical charge generated by the incident light; and
- a signal processing circuit constituted by an amplifier having a function for compulsorily turning off an output transistor impressed with a voltage according to a reference voltage, the signal processing circuit outputting the output voltage according to the incident light by applying a predetermined process to an output signal of the photoelectric conversion means.

5. A photoelectric conversion device according to claim 4, wherein the signal processing circuit comprises:
- a sample-and-hold circuit for receiving a reference signal of the photoelectric conversion means when the photoelectric conversion means is reset by a reset voltage, and an optical signal of the photoelectric conversion means according to a quantity of the optical charge in a first period and a second period, respectively, sampling the reference signal input in the first period, and holding the sampled reference signal in the second period;
- a first buffer amplifier for receiving an output signal of the sample-and-hold circuit;
- a second buffer amplifier, constituted by an amplifier having a function for compulsorily turning off an output transistor, for receiving the reference signal and the optical signal, and
- a subtractor impressed with the reference voltage for removing a noise component of the optical signal by subtracting the sampled and held reference signal received via the first buffer amplifier from the optical signal output from the second buffer amplifier in the second period.

* * * * *